US009908127B2

(12) United States Patent
Borel et al.

(10) Patent No.: US 9,908,127 B2
(45) Date of Patent: Mar. 6, 2018

(54) TWO-CHANNEL DISPENSING DEVICE INTENDED TO CLOSE A VIAL

(71) Applicant: LINDAL FRANCE SAS, Briey (FR)

(72) Inventors: Bernard Borel, Mancieulles (FR); Gérard Monfroy, Verrières (FR)

(73) Assignee: LINDAL FRANCE SAS, Briey (FR)

( * ) Notice: Subject to any disclaimer, the term of this patent is extended or adjusted under 35 U.S.C. 154(b) by 0 days.

(21) Appl. No.: 15/112,895

(22) PCT Filed: Jan. 27, 2015

(86) PCT No.: PCT/EP2015/051607
§ 371 (c)(1),
(2) Date: Jul. 20, 2016

(87) PCT Pub. No.: WO2015/110657
PCT Pub. Date: Jul. 30, 2015

(65) Prior Publication Data

US 2017/0080440 A1 Mar. 23, 2017

(30) Foreign Application Priority Data

Jan. 27, 2014 (FR) ..................................... 14 50638

(51) Int. Cl.
*B65D 35/22* (2006.01)
*B05B 11/00* (2006.01)
(Continued)

(52) U.S. Cl.
CPC .......... *B05B 11/0043* (2013.01); *B65D 83/62* (2013.01); *B65D 83/68* (2013.01); *B05B 11/3081* (2013.01)

(58) Field of Classification Search
CPC ..... B05B 11/0043; B65D 83/62; B65D 83/68; B65D 83/682
See application file for complete search history.

(56) References Cited

U.S. PATENT DOCUMENTS 426,607 A * 4/1890 Single .................... B65D 31/10 383/124
2,941,696 A * 6/1960 Edwin .................... B65D 83/68 128/200.19
(Continued)

FOREIGN PATENT DOCUMENTS

DE 76 31 034 U1 10/1978
EP 2 657 151 A1 10/2013
(Continued)

OTHER PUBLICATIONS

International Search Report and Written Opinion dated Apr. 16, 2015 issued in corresponding application No. PCT/EP2015/051607; w/ English partial translation and partial machine translation (20 pages).

*Primary Examiner* — J. Casimer Jacyna
*Assistant Examiner* — Randall Gruby
(74) *Attorney, Agent, or Firm* — Westerman, Hattori, Daniels & Adrian, LLP

(57) ABSTRACT

A two-channel dispensing device intended to close a vial includes two reservoirs (13, 14), two channels having an inlet end opening into one of the reservoirs and outlet end opening outside of the reservoir. First closing means are provided in each channel, which can change from a closed position to an opened position in which a product can exit said reservoir. The two channels are isolated from each other at least between their inlet ends and the respective closing means. The reservoirs are formed by a single flexible pouch separated by a central partition (12) into first and second compartments (13, 14) performing the functions of the first and second reservoirs. The inlet end of the first channel opens into the first compartment (13) and the inlet end of the second channel opens into the second compartment (14), so that a single pouch makes it possible to form two reservoirs.

18 Claims, 5 Drawing Sheets

(51) Int. Cl.
*B65D 83/62* (2006.01)
*B65D 83/68* (2006.01)

(56) References Cited

U.S. PATENT DOCUMENTS 3,133,575 A * 5/1964 Slemmons ............ B28C 7/0076 206/568
3,224,640 A * 12/1965 Schneider .............. B65D 31/12 222/107
3,288,334 A * 11/1966 Corsette .............. B05B 11/0043 222/107
3,685,695 A * 8/1972 Yuhas .................... B65D 83/68 222/129
3,687,356 A * 8/1972 Goodrich ............... B65D 31/02 383/113
3,693,837 A * 9/1972 Yuhas ................... B05B 7/0876 222/136
3,730,437 A * 5/1973 Rousselot .............. B65D 83/66 222/635
3,731,847 A * 5/1973 Webster ............... B65D 83/682 222/136
4,452,378 A * 6/1984 Christine ........... B65D 75/5883 222/107
4,669,124 A * 5/1987 Kimura .................. B65D 41/34 206/807
4,786,279 A * 11/1988 Wilkinson ................ A61J 1/10 604/411
4,887,912 A * 12/1989 Stumpf .............. B65D 75/5877 383/66
D307,385 S * 4/1990 Kimura ........................... 383/80
5,954,234 A * 9/1999 Connan ................ B65D 81/325 222/94
6,047,817 A * 4/2000 Taylor ................... A61J 7/0046 206/217
6,105,821 A * 8/2000 Christine ............. B65D 77/065 222/105
6,164,822 A * 12/2000 Beer ...................... B65D 31/12 222/145.1
6,164,825 A * 12/2000 Larkin ................. B65D 75/008 383/104
6,220,702 B1 * 4/2001 Nakamura ........... B41J 2/17503 206/524.8
6,308,862 B1 * 10/2001 Fillmore ............. B05B 11/0043 222/105
6,419,118 B1 * 7/2002 Rees ....................... A47J 31/41 137/564.5
6,419,393 B1 * 7/2002 Shibata ............... B05B 11/0043 222/82
6,736,288 B1 * 5/2004 Green .................... B65D 83/62 222/145.6
8,602,260 B2 * 12/2013 Pierson ................ A61C 9/0026 222/102
D729,071 S * 5/2015 Bradley ......................... D9/705
9,038,858 B2 * 5/2015 Hanai .................... B65D 83/62 222/135
9,266,343 B2 * 2/2016 Igawa .................. B41J 2/17559
9,469,468 B2 * 10/2016 Shibata .................. B65D 83/48
2002/0067865 A1 * 6/2002 Stutzman ............... B65D 31/12 383/38
2002/0130138 A1 * 9/2002 Crozet ............... B65D 81/3261 222/94
2003/0024953 A1 * 2/2003 Lilienthal ............. B65D 83/36 222/402.1
2004/0226964 A1 11/2004 Bourque et al.
2005/0029291 A1 2/2005 Arghyris et al.
2005/0109796 A1 * 5/2005 Bourque .............. B65D 75/008 222/94
2006/0049278 A1 * 3/2006 Hoshino ................ B65D 83/62 239/333
2008/0314475 A1 * 12/2008 Fransen ................. B65D 83/62 141/20
2011/0220679 A1 9/2011 Mamiye
2013/0284759 A1 * 10/2013 Teramoto ............ B65D 83/384 222/94
2014/0008389 A1 1/2014 Mekata et al.
2014/0014687 A1 * 1/2014 Cornwell ............... B65D 83/68 222/144.5
2014/0361037 A1 * 12/2014 Green .................... B65D 83/48 222/94
2015/0175341 A1 * 6/2015 Konno ................... A45D 19/02 222/94
2017/0015491 A1 * 1/2017 Cornwell ............... B65D 83/68

FOREIGN PATENT DOCUMENTS

| | | | |
|---|---|---|---|
| FR | 2 315 987 | A1 | 1/1977 |
| FR | 2 833 577 | A1 | 6/2003 |
| FR | 2 887 530 | A1 | 12/2006 |
| GB | 1 558 002 | A | 12/1979 |
| JP | 2008-105753 | A | 5/2008 |
| WO | 2005/087616 | A1 | 9/2005 |

* cited by examiner

TWO-CHANNEL DISPENSING DEVICE INTENDED TO CLOSE A VIAL

TECHNICAL FIELD

The invention relates to a two-channel dispensing device intended to close a vial.

STATE OF THE ART TECHNIQUES

Such devices are found notably in the form of two-channel valves for aerosol containers or in the form of two-channel pumps. They are used to withdraw and dispense products stored in two different reservoirs. The two products must not come in contact until the time of use, either because of their incompatibility or because of their reactivity.

Generally, two separate containers are used, each of which must be fixed to one of the output channels. This requires storing reservoirs and fixing them separately.

Besides the two reservoirs, such dispensing devices are generally also provided with a first channel whose first end, called first inlet end, opens into the first reservoir and whose second end, called first outlet end, opens outside of the first reservoir, and with a second channel whose first end, called second inlet end, opens into the second reservoir and whose second end, called second outlet end, opens outside of the second reservoir. First and second closing means are provided in the first and in the second channel, said closing means being capable of being changed from a closed position, in which a product contained in the corresponding reservoir cannot exit said reservoir, to an opened position, in which a product contained in the corresponding reservoir can exit said reservoir. The closing means can return to the closed position. The two channels are isolated from each other at least between their inlet ends and the respective closing means.

A distinction exists between the dispensing devices with two concentric channels and those with two parallel channels. In the first case, one channel surrounds the other at least in the section between their inlet ends and the closing means. In the second case, the case concerned by the present invention, the inlet ends of the two channels are separated and spaced from each other.

The objective of the invention is to simplify the manufacture of such dispensing devices. Another objective is to obtain reservoirs that occupy in an optimized manner the space defined by the container on which the dispensing device is intended to be fixed.

SUMMARY OF THE INVENTION

The main objective of the invention is achieved in that the reservoirs are formed by a single flexible pouch separated into first and second compartments by a central partition, the first compartment performing the function of the first reservoir and the second compartment that of second reservoir, the inlet end of the first channel opening into the first compartment and the inlet end of the second channel opening into the second compartment so that the two compartments are isolated from one another. Thus, a single pouch makes it possible to form two reservoirs. As a result, it is sufficient to position a single pouch and to fix it, for example, by welding, at the inlet ends of each channel.

In a preferred embodiment of the invention, the pouch is constituted by two substantially trapezoidal panels each having two opposite edges that can be parallel at least in the area of the central partition, the first being called upper edge and the second lower edge, and two side edges, the central partition extending from the lower edge to the upper edge, the upper, lower and side edges of the two panels being connected together so as to form a sealed assembly, a portion of the first channel being interposed between the upper edges of the first and second panels on one side of the central partition and a portion of the second channel being interposed between the upper edges of the first and second panels on the other side of the central partition. Each panel has an inner face and an outer face, the inner faces being directed toward each other, the central partition being obtained by fixing the inner faces of the two panels one over the other, and the upper edge and the lower edge being obtained at least partly by fixing the inner sides of the two panels to each other in the area of the central partition, while interposing the first and second channels.

A simple way of manufacturing such a pouch with two compartments is to use a single strip folded in two along the lower edge, the central partition and the connection of the side edges and of the upper edge being obtained by fixing the two panels to each other by their inner faces.

To optimize the space occupied by the filled pouch in the container, it is preferable to fold the side edges of the pouch between the two panels toward the central partition so as to form in each container a two-fold gusset. Each gusset is defined by two folds, each of which extends from the upper edges toward the lower edges of the panels of the pouch. In this embodiment with gussets, it is also preferable that the pouch be made of a single strip folded on itself so as to form the two gussets. The strip has an inner face and an outer face and it is folded so that the inner face is directed inwardly. The connection between the two panels at the upper edge and the lower edge can then be made partly by fixing the two panels to each other by their inner faces (notably near the central partition) with the interposition of a portion of the channels, and partly by fixing a panel to itself by its inner side (in the area of the folds).

Part or all of the corners of the folds which form the gussets, and which are located opposite from the central partition, can be cut. In this case, the lower edge and/or the upper edge are inclined toward the opposite edge when moving away from the central partition. The four upper corners and/or the four lower corners can be cut. It can also be sufficient to simply incline the upper edge and/or the lower edge toward the other edge when moving away from the central partition, without cutting the corner located above or below the inclined portion of the edge. In this variant, one moves away more or less from the trapezoidal shape depending on the inclination of the edges, and the upper and lower edges, at least in their inclined portions, are no longer parallel.

Whether the compartments are provided with gussets or not, the portions of the channels interposed in the upper edge preferably have each an outer cross-section in the shape of a diamond, the angles of the long axes of the diamonds being pointed and the angles of the short axes being rounded, the angles of the long axes of the two passages being aligned in a same plane. To improve the attachment of the pouch to the dispensing device, notably in the area of the central partition, it is preferable to connect the two portions of the channels interposed in the upper edges by a wall extending from one pointed angle of the end of the first channel toward the adjacent pointed angle of the end of the second channel.

The different fixations of the panels to each other, notably the fixation of the side edges, of the upper and lower edges and of the central partition, can be obtained in different ways, notably by gluing or by thermal bonding, in particular by welding.

In order to facilitate the introduction of the pouch in a container, it is preferable to roll up the pouch around the central partition or to accordion-fold it on both sides of the central partition, retaining means being preferably provided to maintain the pouch in this position.

The dispensing device of the invention can be applied to two-channel valves for aerosol containers as well as to two-channel pumps.

SHORT DESCRIPTION OF THE DRAWINGS

The invention is described in more detail below with the assistance of the following figures.

EMBODIMENT

Figure 1:
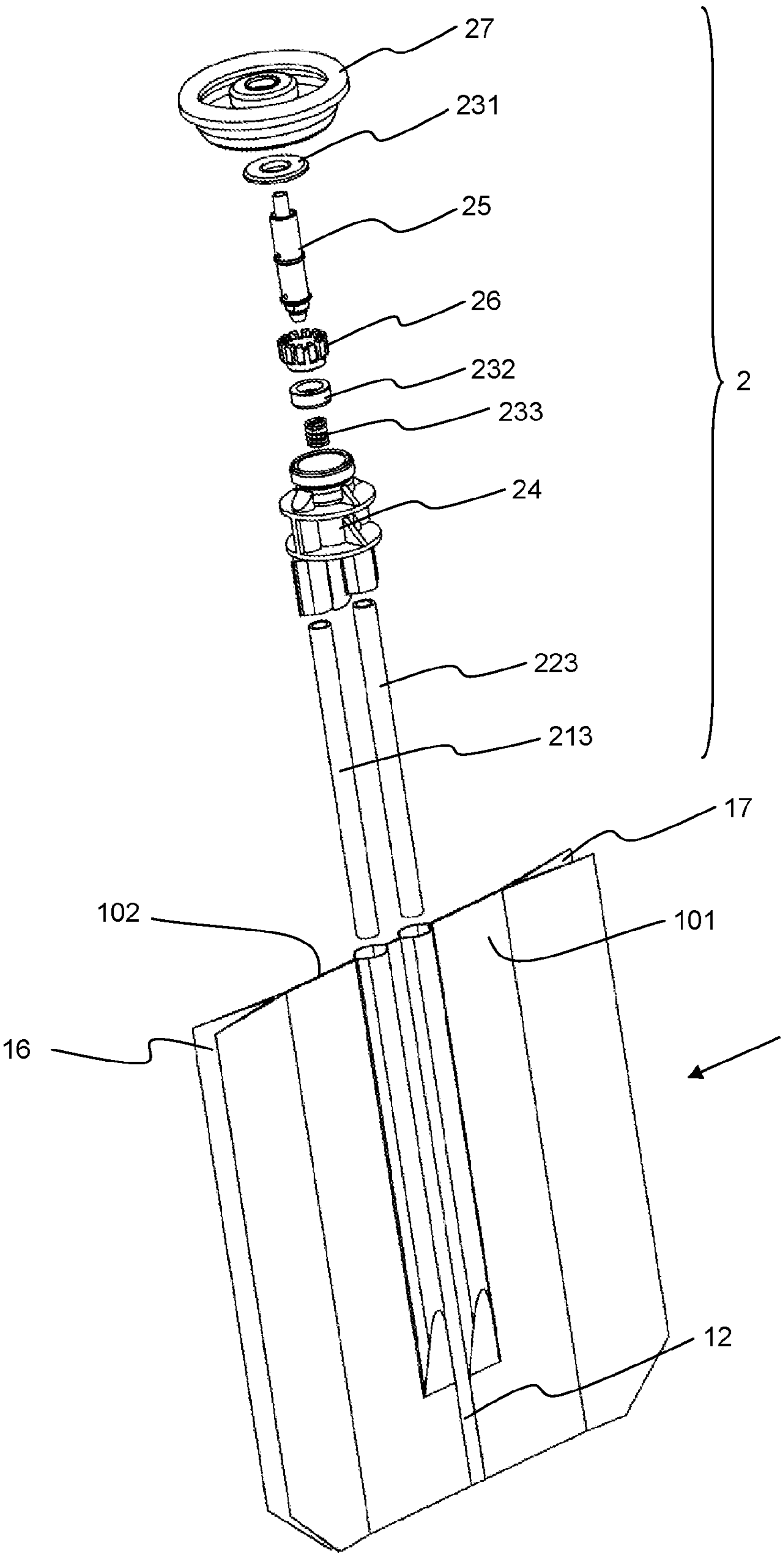
FIG. 1 is an exploded view of the main elements of a two-channel valve equipped with a two-compartment pouch.
Figure 2:
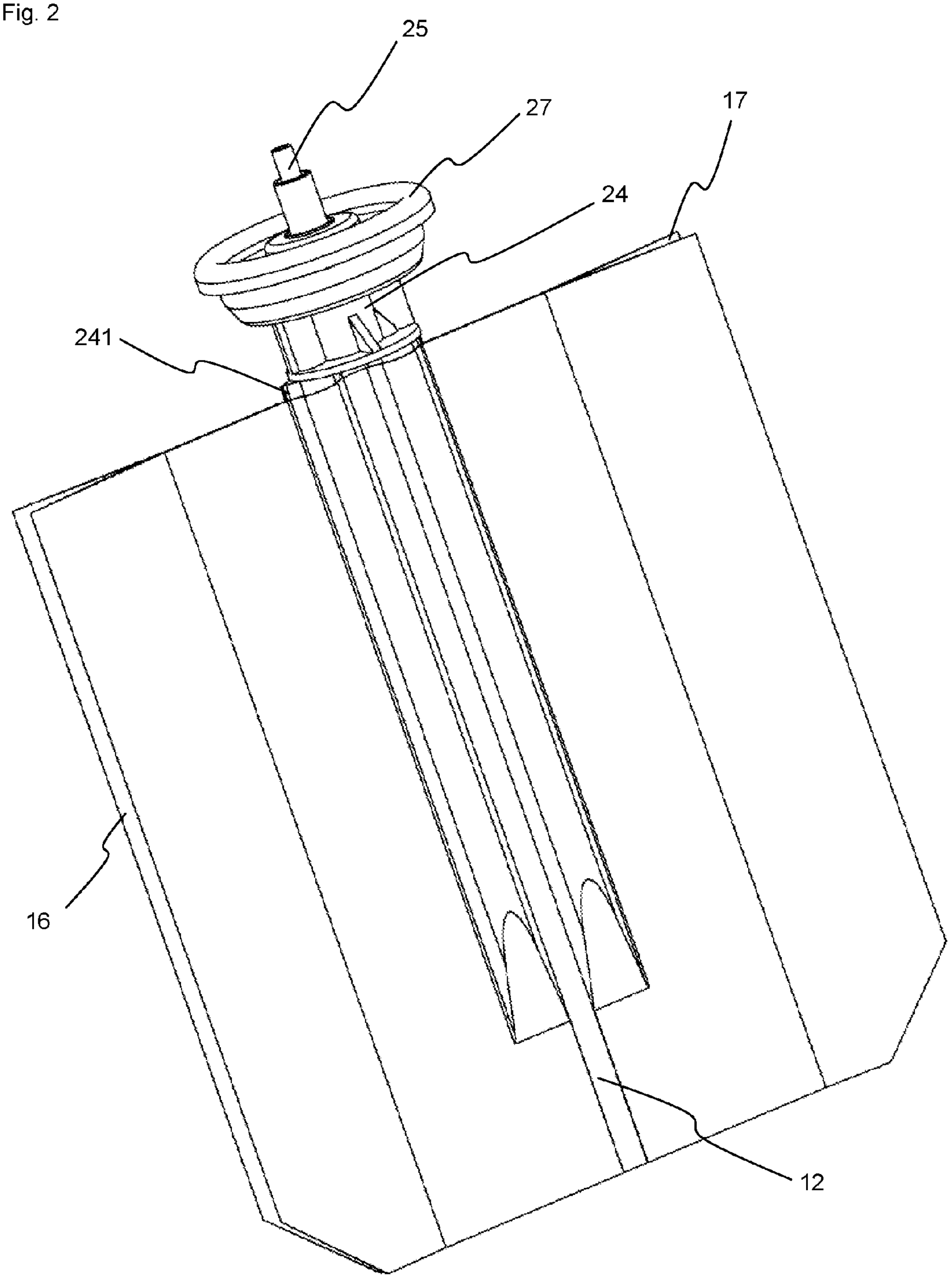
FIG. 2 is a perspective view of the assembly formed by a two-channel valve and a two-compartment pouch.

The invention relates to a two-channel dispensing device intended to close a container. It is particularly suitable for valves with two separate channels for aerosol containers or for pumps with two separate channels. The example presented here concerns an aerosol valve. It can be easily generalized to other delivery devices such as two-channel pumps.

The dispensing device equipped with the double pouch is intended to be fixed on a container. In the mounted state, the dispensing device has an inner side facing the inside of the container and an outer side, directed toward the outside of the container. The terms "inner" and "outer" refer to this mounted state, even when the dispensing device is considered alone. In addition, the container and the dispensing device have ordinarily a certain symmetry of rotation about a main axis passing through the vial and then the dispensing device. The adjectives "axial" or "radial" refer to this main axis and define an element parallel to the axis or perpendicular to this axis, respectively.

The term two-channel dispensing device means a device having two distinct passages or channels (21, 22), each connecting, when the device is mounted on a container, the inside of said container to the outside of the container. These devices are used to withdraw two different products stored in two separate reservoirs in order to prevent them from coming in contact with each other prior to being withdrawn. Each passage (21, 22) is characterized by a first end (211, 221), called inlet end, located on the inner side of the withdrawing device and by a second end (212, 222), called outlet end, located on the outside of the withdrawal device. Closing means (231, 253, 232, 254, 233) are provided within the dispensing device to sealingly close each of the passages so that, when the dispensing device is in the closed position, the portions of the passages located upstream of the closing means (that is to say, between the inlet ends (211, 221) and the closing means) do not communicate with each other. Downstream of the closing means, the passages can meet to form a common passage, or, on the contrary, they can remain separate until exiting from the valve, as is the case in the exemplary embodiment presented here.

The present invention relates to two-channel dispensing devices whose passages, on the inner side, are separated and at a distance from each other. They can be extended on the inner side by dipping tubes (213, 223).

In the example shown here, the valve (2) is essentially formed by a valve body (24), a stem (25), a first seal (231) and a second seal (232), a crenellated annular spacer (26) separating the two seals, a spring (233) and a cup (27). The cup serves to fix the valve on the neck of a housing which is not shown. The stem (25) is provided with two concentric channels (251, 252) that open at the outer side surface of the stem, each by one or more orifices (253, 254). The orifices of a channel are all positioned in a same radial plane relative to the main axis. The radial plane in which the orifices (253) of the first channel (251) open is separate from the radial plane in which the orifices (254) of the second channel (252) open. The channels (251, 252) and their orifices (253, 254) each form the portion of the passages (21, 22) located downstream of the closing means. It is not necessary for these channels to be concentric; they could be distinct and at a distance from one another. The valve is crimped onto the cup (27). The first seal (231) has the shape of a flat circular gasket whose inner diameter corresponds to the outer diameter of the stem in the area of the first orifices (253), while the second seal (232) has a generally cylindrical shape whose inner diameter corresponds to the outer diameter of the stem in the area of the second orifices (254). The spring (233) tends to push the stem outwards (upwards in the figures) in the closed position. The stem (25) is retained in the closed position by a shoulder (255) which comes to abut against the first seal (231). In the closed position of the valve, the first orifices (253) are aligned with the first seal (231) and the second orifices (254) with the second seal (232). The passages (21, 22) are thus interrupted at these two seals and the inside of the container is isolated from the outside. When the stem (25) is depressed toward the inside of the container against the force of the spring (233), the orifices (253, 254) come closer to the inside of the container and are no longer in contact with the seals. The passages (21, 22) are open and the products can exit. The first seal (231), the ends of the first orifices (253) in contact with the first seal and the spring (233) form the first closing means, while the second seal (232), the ends of the second orifices (254) in contact with the second seal and the spring (233) form the second closing means. As soon as the pressure exerted on the stem is removed, the stem returns to its initial position under the effect of the spring. As a result, the valve, and therefore the closing means along with it, can be opened and closed at will.

Rather than using two pouches or two separate containers, one for each passage, the invention uses a double pouch.

The double pouch (1) is preferably formed by two superposed, substantially trapezoidal panels (101, 102). In practice, essentially, rectangular panels are used. Each panel has an inner face and an outer face, which can be of identical or different nature. The two panels face each other by their inner faces. In addition, each panel has two opposing edges which can be at least partly parallel, the first called upper edge (15) and the second lower edge (11), and two side edges (103, 104). If the panels are rectangular, the two side edges are parallel to each other. The upper, lower and side edges of the two panels are connected together so as to form a sealed assembly, forming the upper edge, the lower edge and the side edges of the pouch. The central partition (12) is obtained by fixing the two faces (101, 102) one over the other by their inner faces. It extends from the upper edge to the lower edge of the pouch. A portion of the first channel, for example, its inlet end (211), is interposed in the upper edge of the pouch between the upper edges of the first and second panels on one side of the central partition, and a portion of the second channel, for example, its inlet end (221), is interposed in the upper edge of the pouch between the upper edges of the first and second panels on the other side of the central partition.

In a first simple embodiment of the invention, the pouch is formed by a single strip folded in two along the lower edge, the central partition and the connection of the side edges and of the upper edge being obtained by fixing the two panels one over the other while the fold forms the lower edge of the pouch. The fixation can be obtained, for example, by heat sealing or by gluing. The pouch is thus divided into two separate compartments (13, 14) by the central partition. Several manufacturing methods are possible. The pouch can be manufactured in a first step and fixed to the valve in a second step, the central partition being provided at one or the other step. It is also conceivable to form the pouch by folding and to insert the valve before providing the various welds.

For example, the strip is folded onto itself along the lower edge of the pouch, the inner face is welded onto itself, on the one hand, along the side edges forming the side edges of the pouch, and on the other hand, in its central portion, from the fold toward the upper edge of the pouch, so as to form a central weld. The double pouch is thus divided into two separate compartments (13, 14) separated from each other by the central weld (12). It is still open at the upper edge. The valve (2) is then introduced into the upper opening, with the first inlet end (211) in the first compartment (13) and the second inlet end (221) in the second compartment (14). Finally, the inner face of the double pouch is welded at its upper edge, partly onto itself and partly on the outer walls of the inlet ends (211, 221) of the two channels. The central weld (12) extends to this upper weld so that the two compartments are sealed and completely separated from each other. Their contents cannot come in contact without going through the valve.

After it has been attached to the valve, the double pouch is preferably rolled up around the main longitudinal axis of the valve or accordion-folded on both sides of this main axis. The pouch is maintained in this position, for example, by using one or more self-adhesive strips. When filling a vial equipped with a two-channel valve provided with a double pouch of the invention, which is rolled up or accordion-folded, the two compartments (13, 14) expand in volume, the adhesive strip yields, and the two compartments can deploy within the vial.

During filling, the machine fills the two pouches in succession. When the pouches are rolled up, it can happen that the side edge of the second bag is wedged between the first expanded pouch and the wall of the housing. In this case, a tearing of the second compartment or a rupture of the second channel could be observed at the time of filling the second reservoir. Moreover, once filled, the reservoirs have substantially the form of cylinders that do not use the space of the housing optimally.

Figure 4:
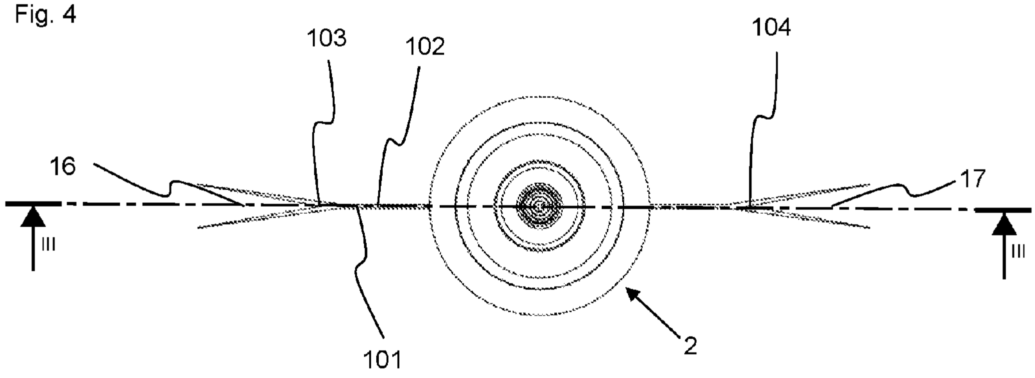
FIG. 4 is a top view of the assembly of FIG. 2.
Figure 5:
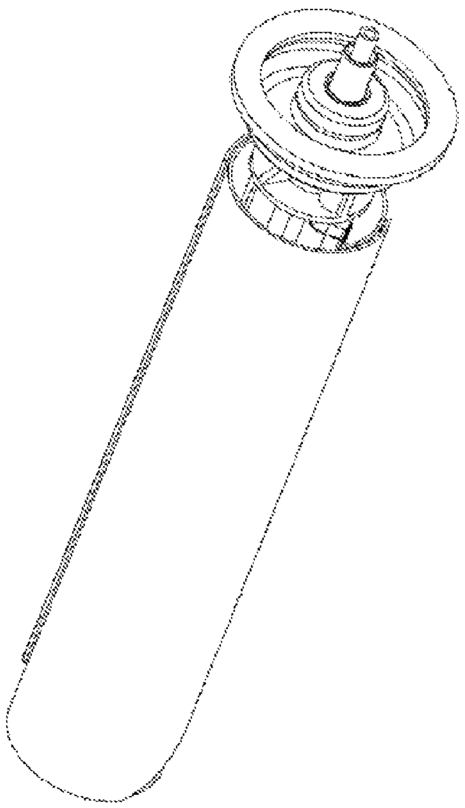
FIG. 5 is a perspective view of the assembly of FIG. 2 in which the pouch is rolled up around the main longitudinal axis of the valve.
Figure 6:
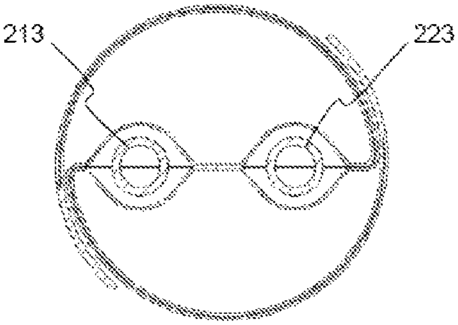
FIG. 6 is a cross-sectional view through the rolled-up pouch.

To overcome these two disadvantages, in a second embodiment of the pouch, each compartment (13, 14) is equipped with a vertical gusset (16, 17). For this, the side edges (103, 104) of the bag are folded between the two panels toward the central partition (12) so as to form a two-fold gusset (16, 17) in each reservoir. In the area of the gusset, because of the folding of the side edges between the two panels, the two panels do no longer face each other; each panel faces itself. In practice, one can, for example, take a rectangular strip of which two opposite edges are fixed to one another so as to form a tubular sleeve having an inner face and an outer face. A portion of the sleeve forms the first panel and the other portion the second panel of the pouch. The two edges of the strip can overlap so that the inner face of an edge is located on the outer face of the other edge. The two edges can also overlap so that the two inner faces are in contact. It is also possible to place the two side edges side by side and fix them together by a welded strip on their inner and/or outer sides. The two gussets (16, 17) are obtained by folding the side edges (103, 104) between the two panels (101, 102) toward the center of the pouch. Each gusset (16, 17) thus has two folds and extends from the lower edge to the upper edge of the pouch. In the example shown here, the width of a fold corresponds approximately to ⅙ of the width of each panel (101, 102). It is now possible to weld the pouch onto itself by its inner face, on the one hand, in the area of the lower edge, forming a lower weld (11), and on the other hand, in its central part (12), from the lower edge (11) toward the upper edge. The two folds forming a gusset are not welded to each other, since the lower weld (11) divides in the area of each fold. This is well visible in FIG. 4. In fact, only the inner face of the tubular wall is fixed to itself. This is easily obtained by using a laminated strip whose first face can be welded onto itself whereas the second side cannot. The first face is directed toward the inside of the pouch, whereas the second face is directed outwards. The inside of the folds can be welded in the area of the upper and lower edges, while the outer face of the first fold is not welded onto the outer face of the second fold. It is conceivable, although this is not necessary, that the outer face of the folds is also welded.

The double pouch thus has two compartments (13, 14) separated from each other by the central weld (12) and each equipped, opposite from the central weld (12), with a gusset (16, 17). The folds forming the gussets are located in planes parallel to the longitudinal axis of the valve. Like in the first embodiment of the invention, the valve (2) is inserted into the top opening of the double pouch, with the first inlet end (211) in the first compartment (13) and the second inlet end (221) in the second compartment (14). The double pouch is welded at its upper edge, partly onto itself and partly on the outer walls of the inlet ends (211, 221) of the passages, thus forming an upper weld (15). Like at the lower edge, the folds of a gusset are not welded one over the other, since the upper weld divides at each fold. This is well visible in FIG. 4. The central weld (12) extends up to this upper weld (15) so that the two compartments are completely separated from each other and their contents cannot come in contact without going through the valve. The order in which the gussets and the different welds are made, including the weld concerning the central partition, does not matter. In particular, it is conceivable to simultaneously form the folds and the welding of the side edges of the strip, while making the central partition, the upper and lower welds in a subsequent step.

Figure 7:
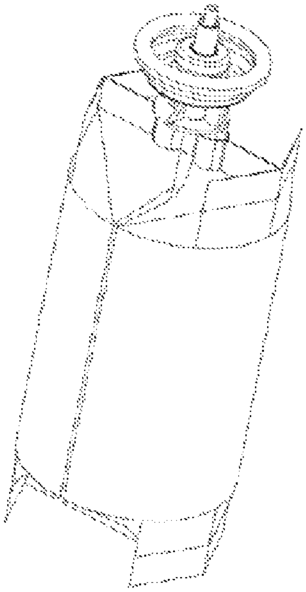
FIG. 7 is a schematic perspective view of the assembly of FIG. 2 in which the pouch is filled.
Figure 10:
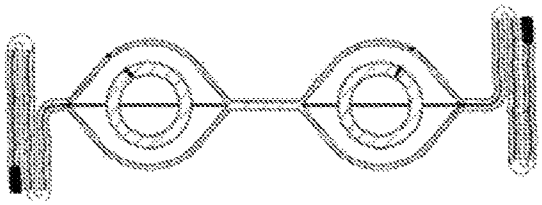
FIG. 10 is a cross-sectional view through the two-channel valve with a pouch that is accordion-folded according to a variant of the invention.
Figure 8:
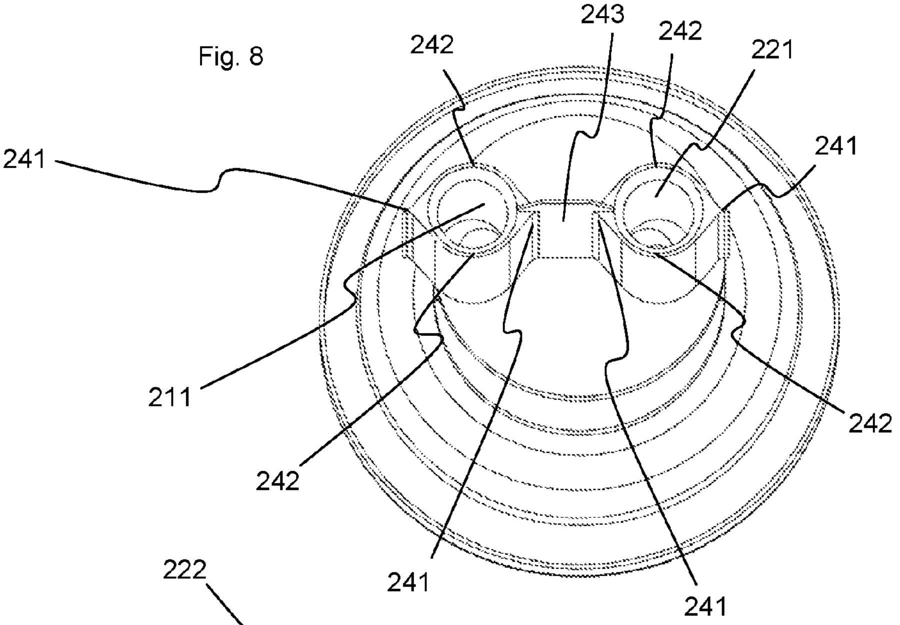
FIG. 8 is a perspective view of the two-channel valve.
Figure 9:
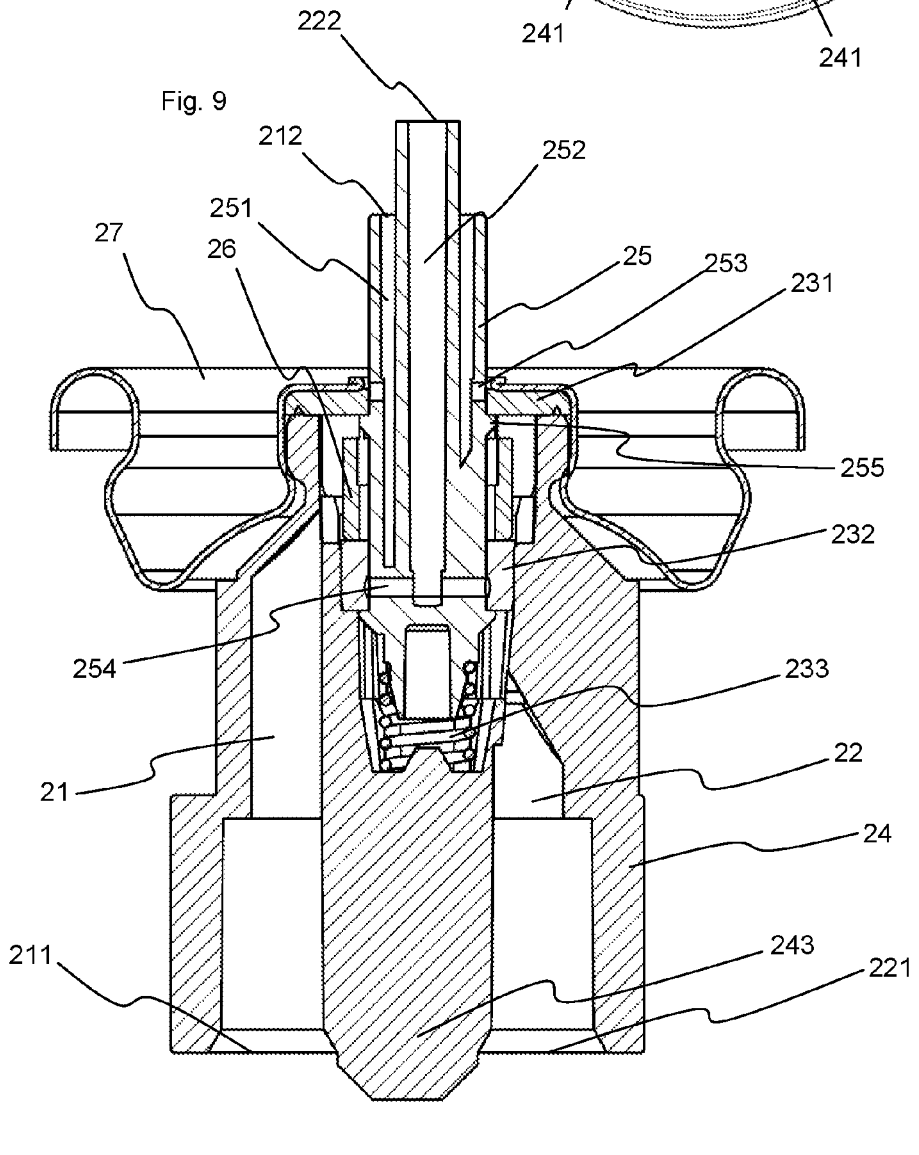
FIG. 9 is a cross-sectional view through the two-channel valve.

Like in the first embodiment, the double pouch can be rolled up around the main axis or accordion-folded on both sides of this axis. It is maintained in this position with one or more retaining strips until the reservoirs are filled. During filling, the retaining strips yield under the pressure of the product and the compartments expand in volume. Thanks to the gussets, the width of the double pouch before filling is smaller. This way, the outer side edges of the gussets, that is to say, the top of the folds, rub for a shorter time against the container wall during unwinding. When filling the compartments, the gussets deploy and each compartment occupies a space fairly close to a half-cylinder. This is shown schematically in FIG. 7.

Figure 3:
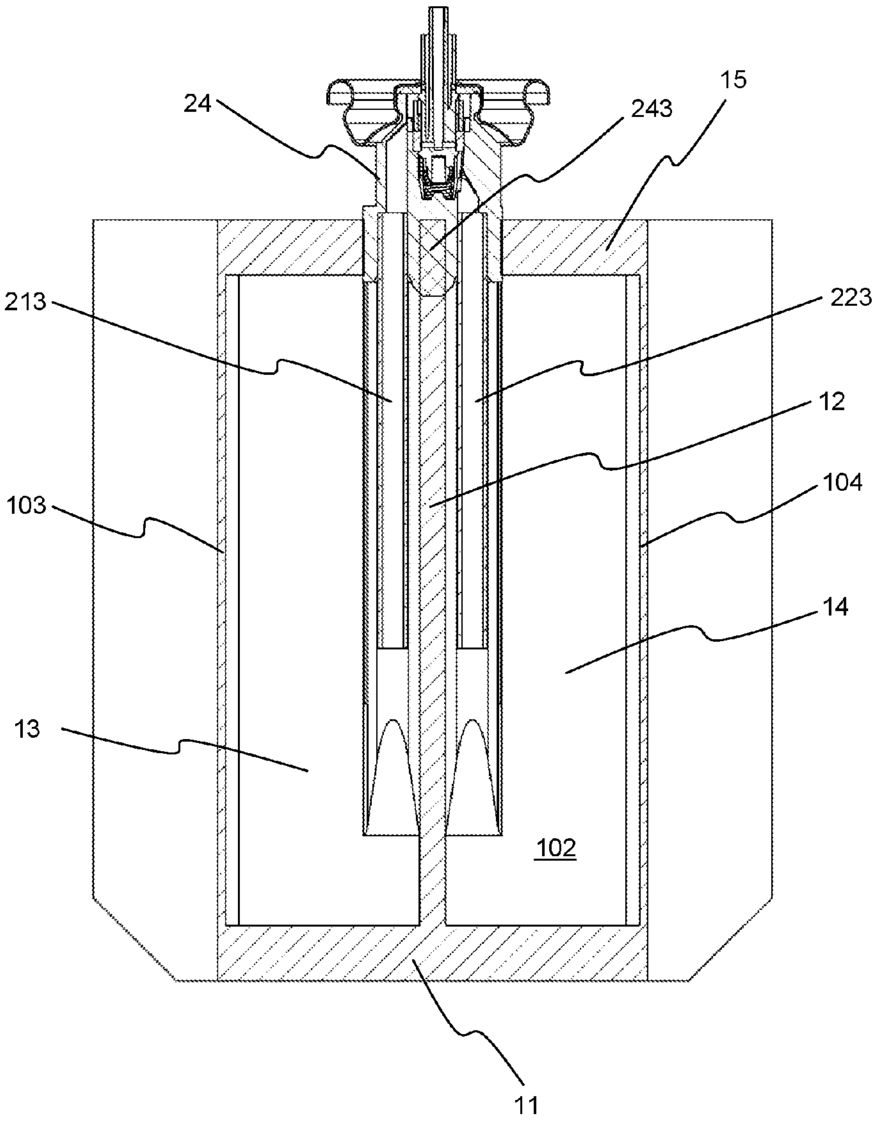
FIG. 3 is a cross-sectional view of the assembly of FIG. 2 along line III-III of FIG. 4.

The bottoms and/or the tops of the housings often have a dome shape. To prevent the lower or upper edges of the folds forming the gussets from rubbing against the bottom or top of the reservoir, it is possible to cut the lower or upper outer corners of the folds, as shown in FIG. 3. In this case, the corresponding weld follows the cut edge. It can be sufficient to provide that the weld is inclined toward the center of the pouch when approaching the side edges, without having to cut the excess material. The angles thus left do not expand in volume during filling, and they do not create sufficient resistance to risk tearing the pouch.

To ensure secure attachment of the double pouch on the inlet ends (211, 221) of the passages, the inlet ends of the passages have each preferably an external cross-section in the shape of a diamond. The angles (241) of the long axes of the diamonds are pointed and the angles (242) of the short axes are rounded. Moreover, the angles (241) of the long axes of the two passages are aligned in a same radial plane. In order to ensure a good weld strength between the two inlet ends (211, 221), it can be provided that these two inlet ends (211, 221) are connected by a radial wall (243) extending from a pointed angle (241) of the first inlet end (211) to the adjacent pointed angle (241) of the second inlet end (221).

The central weld (12) is not necessarily located in the middle of the tubular wall 5. It can be off-center so as to form two compartments having different volumes. Likewise, the gussets of the compartments are not necessarily of the same depth. This also makes it possible to form pouches having different volumes.

Fixing the two panels onto each other, particularly at the central partition (12) and at the side, upper and lower edges (11, 15), can be carried out by any suitable means, notably by heat sealing, for example, by ultrasound, induction, heating jaws, laser, hot air jet. Depending on the materials, these fixations can be obtained by other means, such as by gluing.

The pouch can be made of a single material or with several layers of different materials. As an example, one can mention laminated films composed of polyethylene terephthalate/aluminum/nylon/polyethylene or polypropylene.

The two-channel valve equipped with a pouch of the invention can be used in many fields, notably in the pharmaceutical and cosmetic industry, for technical products or food, household care products (wax for furniture), air fresheners, insecticides, etc.

By fixing the two panels of the pouch one over the other at the central partition, it is not necessary to interpose between the two compartments a further wall, for example, in the form of a third panel. The central partition is located in the same plane as the upper and lower edges of the pouch. Similarly, by forming the folds by folding a single strip, the need to weld folds between two different panels is avoided. A single strip makes it possible to form the two panels, the central partition and optionally the gussets.

LIST OF REFERENCES

1 Double pouch
101 Front panel
102 Back panel
103 1st side edge
104 2nd side edge
11 Lower weld
12 Central weld (central partition)
13 1st compartment
14 2nd compartment
15 Upper weld
16 1st vertical gusset
17 2nd vertical gusset
2 Two-channel valve
21 1st channel
211 Inner end of the 1st channel (1st inlet end)
212 Outer end of the 1st channel (1st outer end)
213 Dipping tube
22 2nd channel
221 Inner end of the 2nd channel (2nd inlet end)
222 Outer end of the 2nd channel (2nd outer end)
223 Dipping tube
23 Closing means
231 1st seal
232 2nd seal
233 Spring
Valve body
241 Angles of the long axes of the diamonds
242 Angles of the short axes of the diamonds
243 Radial wall
25 Stem
251 1st channel
252 2nd channel
253 Outlet orifices of the 1st channel
254 Outlet orifices of the 2nd channel
255 Shoulder
26 Crenellated annular spacer
27 Cup

The invention claimed is:

1. Two-channel dispensing device intended to close a vial, which device is equipped with a first reservoir and a second reservoir, a first channel having a first inlet end, the first inlet end opening into the first reservoir, and having a first outlet end, the second outlet end opening outside of the first reservoir, and a second channel having a second inlet end, the second inlet end opening into the second reservoir, and having a second outlet end, the second outlet end opening outside of the second reservoir, each of the first channel and the second channel being changeable from a closed configuration in which a product contained in the corresponding reservoir cannot exit the reservoir to an opened configuration in which a product contained in the corresponding reservoir can exit the reservoir, portions of the first and second channels including the first and second inlet ends being isolated from each other, the first and second inlet ends of the first and second channels being separated and spaced from each other, the first and second reservoirs are formed by a single flexible pouch separated into first and second compartments by a central partition, the first compartment forming the first reservoir and the second compartment forming the second reservoir, the first inlet end of the first channel opening into the first compartment and the second inlet end of the second channel opening into the second compartment, so that the first and second compartments are isolated from one another, wherein the pouch is formed by first and second panels overlapping each other and each having first and second opposite edges, the first called upper edge and the second lower edge, and first and second side edges, the upper, lower and side edges of the first and second panels being connected together so as to form a sealed assembly by forming an upper edge, a lower edge and side edges of the pouch, the central partition extending from the lower edge to the upper edge of the pouch, a portion of the first channel being interposed in the upper edge of the pouch between the upper edges of the first and second panels on one side of the central partition and a portion of the second channel being interposed in the upper edge of the pouch between the upper edges of the first and second panels on the other side of the central partition, wherein the first and second side edges of the pouch are folded between the first and second panels toward the central partition, so as to form first and second two-fold gussets in a space between the first and second panels.

2. The dispensing device according to claim 1, wherein the pouch is formed by a single strip folded to form the first and second panels and the pouch lower edge, wherein the central partition, a connection between the side edges of the first and second panels and a connection between the upper edges of the first and second panels are achieved by fixing the first and second panels one onto the other, so that the lower edge of the pouch is in the form of a fold between the first and second panels, and the central partition, the side edges and the upper edge are in the form of a fixation between the inner faces of the first and second panels.

3. The dispensing device according to claim 2, wherein the portions of the channels interposed in the upper edges of the first and second panels each have an outer cross-section in a shape of a diamond, angles of long axes of the diamonds being pointed and angles of short axes of the diamonds being rounded, the angles of the long axes of the first and second channels being aligned in a same plane.

4. The dispensing device according to claim 1, wherein the pouch comprises a single strip folded onto itself to form the folds of the two gussets.

5. The dispensing device according to claim 4, wherein a connection between the first and second panels at the pouch upper edge and at the pouch lower edge is formed partly by fixing the first and second panels together and partly by fixing each panel onto itself at the folds of the gussets.

6. The dispensing device according to claim 4, wherein at least some corners of the folds forming the gussets are cut, wherein the cut corners are located at the side edges of the pouch.

7. The dispensing device according to claim 1, wherein a connection between the first and second panels at the pouch upper edge and at the pouch lower edge is formed partly by fixing the first and second panels together and partly by fixing each panel onto itself at the folds of the gussets.

8. The dispensing device according to claim 7, wherein at least some of corners of the folds forming the gussets are cut, wherein the cut corners are located at the side edges of the pouch.

9. The dispensing device according to claim 1, wherein at least some corners of the folds forming the gussets are cut, wherein the cut corners are located at the side edges of the pouch.

10. The dispensing device according to claim 1, wherein the portions of the channels interposed in the upper edges of the first and second panels each have an outer cross-section in a shape of a diamond, angles of long axes of the diamonds being pointed and angles of short axes of the diamonds being rounded, the angles of the long axes of the first and second channels being aligned in a same plane.

11. The dispensing device according to claim 10, wherein the portions of the first and second channels interposed in the upper edges of the panels are connected by a wall extending from a pointed corner of the portion of the first channel interposed between the first and second panels toward the adjacent pointed angle of the portion of the second channel interposed between the first and second panels.

12. The dispensing device according to claim 1, wherein the sealed assembly includes a fixation of the side edges, the upper and lower edges and the central partition obtained by heat sealing.

13. The dispensing device according to claim 1, wherein the first and second panels are trapezoidal.

14. The dispensing device according to claim 1, wherein the pouch is rolled up around the central partition or accordion-folded on both sides of the central partition.

15. The dispensing device according to claim 14, wherein retaining means are provided to maintain the pouch in the rolled up or accordion-folded position.

16. The dispensing device according to claim 1, which is in the form of a two-channel valve for aerosol containers.

17. The dispensing device according to claim 1, wherein a first closing means is provided in the first channel and a second closing means is provided in the second channel, each of the first and second closing means being changeable from a closed position configuration in which a product contained in the corresponding reservoir cannot exit the reservoir to an opened position in which a product contained in the corresponding reservoir can exit the reservoir, the first and second channels being isolated from each other at least between their inlet ends and the respective closing means.

18. Two-channel dispensing device intended to close a vial, which device is equipped with a first reservoir and a second reservoir, a first channel having a first inlet end, the first inlet end opening into the first reservoir, and having a first outlet end, the second outlet end opening outside of the first reservoir, and a second channel having a second inlet end, the second inlet end opening into the second reservoir, and having a second outlet end, the second outlet end opening outside of the second reservoir, each of the first channel and the second channel being changeable from a closed configuration in which a product contained in the corresponding reservoir cannot exit the reservoir to an opened configuration in which a product contained in the corresponding reservoir can exit the reservoir, portions of the first and second channels including the first and second inlet ends being isolated from each other, the first and second inlet ends of the first and second channels being separated and spaced from each other, the first and second reservoirs are formed by a single flexible pouch separated into first and second compartments by a central partition, the first compartment forming the first reservoir and the second compartment forming the second reservoir, the first inlet end of the first channel opening into the first compartment and the second inlet end of the second channel opening into the second compartment, so that the first and second compartments are isolated from one another, wherein the pouch is formed by first and second panels overlapping each other and each having first and second opposite edges, the first called upper edge and the second lower edge, and first and second side edges, the upper, lower and side edges of the first and second panels being connected together so as to form a sealed assembly by forming an upper edge, a lower edge and side edges of the pouch, the central partition extending from the lower edge to the upper edge of the pouch, a portion of the first channel being interposed in the upper edge of the pouch between the upper edges of the first and second panels on one side of the central partition and a portion of the second channel being interposed in the upper edge of the pouch between the upper edges of the first and second panels on the other side of the central partition, wherein the pouch is formed by a single strip folded to form the first and second panels and the pouch lower edge, wherein the central partition, a connection between the side edges of the first and second panels and a connection between the upper edges of the first and second panels are achieved by fixing the first and second panels one onto the other, so that the lower edge of the pouch is in the form of a fold between the first and second panels, and the central partition, the side edges and the upper edge are in the form of a fixation between the inner faces of the first and second panels.

* * * * *